United States Patent
Yamada et al.

(10) Patent No.: US 6,984,730 B2
(45) Date of Patent: Jan. 10, 2006

(54) CELLULOSE ACYLATE AND SOLUTION THEREOF

(75) Inventors: Tsukasa Yamada, Kanagawa (JP); Yasuo Mukunoki, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/466,357

(22) PCT Filed: Jan. 17, 2002

(86) PCT No.: PCT/JP02/00273

§ 371 (c)(1), (2), (4) Date: Jul. 16, 2003

(87) PCT Pub. No.: WO02/057318

PCT Pub. Date: Jul. 25, 2002

(65) Prior Publication Data

US 2004/0059106 A1    Mar. 25, 2004

(30) Foreign Application Priority Data

Jan. 17, 2001 (JP) .............................. 2001-008388
Mar. 14, 2001 (JP) .............................. 2001-071518

(51) Int. Cl.
C08B 3/00  (2006.01)
C07H 1/00  (2006.01)

(52) U.S. Cl. .............................. 536/56; 536/58; 536/63; 536/69; 536/124

(58) Field of Classification Search ................ 536/56, 536/58, 63, 69, 124
See application file for complete search history.

(56) References Cited

FOREIGN PATENT DOCUMENTS

JP        09286801 A  * 11/1997
JP        11-005851 A    1/1999

OTHER PUBLICATIONS

Shibata et al, U.S. Appl. No. 10/257,645, filed Oct. 15, 2002.*

* cited by examiner

*Primary Examiner*—James O. Wilson
*Assistant Examiner*—Everett White
(74) *Attorney, Agent, or Firm*—Buchanan Ingersoll PC

(57) ABSTRACT

A cellulose acylate which is a polymer obtained by substituting cellulose with acyl groups in 2-, 3-, 6-positions. The total degree of acyl substitution in the 2- and 3-positions is regulated to from 1.70 to 1.90. The degree of 6-position acyl substitution is regulated to 0.88 or higher.

12 Claims, No Drawings

CELLULOSE ACYLATE AND SOLUTION THEREOF

FIELD OF INVENTION

The present invention relates to a cellulose acylate, a solution thereof, a process for preparation thereof, and a cellulose acylate film.

BACKGROUND OF INVENTION

A cellulose acylate film is used in various photographic or optical elements because it is tough and has enough flame retardant properties. In fact, the cellulose acylate film is a representative photographic support. Further, having optical isotropy, the film is also used in a liquid crystal display device, which has recently extended its market. In the device, the cellulose acylate film often serves as a protective film of a polarizing plate or a color filter.

A cellulose acylate film is generally produced according to a solvent cast method or a melt cast method. The solvent cast method comprises the steps of casting a solution of cellulose acylate dissolved in a solvent (that is called "dope") onto a support, and evaporating the solvent to form a film. On the other hand, the melt cast method comprises the steps of heating cellulose acylate to melt, casting the melt on a support, and cooling to form a film. Practically, the solvent cast method is generally adopted because it can form a highly flat film, as compared with the melt cast method. The solvent cast method is described in various documents. In some recently proposed processes of the solvent cast method, it is aimed to shorten the time between the steps of casting the dope on the support and peeling the formed film off, so that the productivity of the film formation may be improved. For examples, Japanese Patent Publication No. 5(1993)-17844 discloses a process in which a concentrated dope is cast onto a cooling drum to shorten the time between the casting step and the peeling step.

The solvent used in the solvent cast method must have functions of not only dissolving cellulose acylate but also forming an excellent film. In more detail, the viscosity and the polymer concentration of the solution (dope) should be appropriately adjusted to form a flat film having a uniform thickness. The dope also should be easily set to gel. Further, the formed film should be easily peeled from the support. In order to satisfy these requirements, the most appropriate solvent should be selected. Moreover, the solvent should be so easily evaporated that it scarcely remains in the film.

Various organic solvents have been proposed as the solvent of cellulose acylate, but only methylene chloride has been practically used. However, since methylene chloride has defects in view of environment protection and the boiling point, a new solvent substituting for methylene chloride has been searched.

J. M. G. Cowie et al. report in Makromol., Chem., 143 (1971) 105, that cellulose acylate having a substitution degree in the range of 2.80 to 2.90 is dissolved in acetone through a specific process. The process comprises the steps of cooling the cellulose acylate (in the reported process the acyl group is restricted to acetyl group) in acetone at a temperature of −80 to −70° C., and warming it to obtain 0.5 to 5 wt. % solution of cellulose acylate in acetone. The method, in which the mixture of cellulose acylate is cooled in an organic solvent to obtain a solution, is hereinafter referred to as "cooling dissolution method". The solution of cellulose acylate in acetone is also reported by K. Kamide et al., Bulletin of Textile Machinery Society, Vol. 34, pp. 57 (1981). The report (written in Japanese) is entitled "Dry spinning process using acetone solution of triacetyl cellulose". In the report, the cooling dissolution method is applied to the art of fiber spinning. The experiments described in the report examine the mechanical strength, the dyeing property and the sectioned shape of the fiber obtained by the cooling dissolution method. In the report, 10 to 25 wt. % solution of cellulose acetate is used to form a fiber.

Methods other than the cooling dissolution method can be adopted to prepare the cellulose acylate solution. For example, "high temperature method", in which cellulose acylate is dissolved at high temperature and high pressure, is proposed.

A cellulose acylate film is produced by the solvent cast method, which comprises the steps of casting the above-described solution of cellulose acylate (dope) onto a support, evaporating the solvent to form a film, and peeling the film from the support. The thus-formed film, however, often has an undesirable surface. In detail, the dope is often so viscous that striped traces are formed in casting and not leveled to remain on the film surface. As a result, the formed film does not have a smooth surface and the striped traces are sometimes severe enough to be recognized as striped defects. In order to obtain a good surface, the dope must be diluted or the cast dope must be dried under moderate conditions. However, these measures increase the production cost and impair the production speed, and hence it has been wanted to develop new measures.

SUMMARY OF INVENTION

An object of the present invention is to provide a cellulose acylate solution that has excellent shelf-life stability and that has a low viscosity within a practical dope concentration range.

Another object of the invention is to provide a cellulose acylate in which the total substitution degree of acyl groups at 2- and 3-positions is in the range of 1.70 to 1.90 and the substitution degree of acyl group at 6-position is 0.88 or more.

Still another object of the invention is to provide a cellulose acylate solution in which the cellulose acylate having substitution degrees of acyl groups at 2- and 3-positions in total in the range of 1.70 to 1.90 and a substitution degree of acyl group at 6-position in the range of 0.88 or more is dissolved in an essentially non-chlorinated solvent.

Further, yet another object of the invention is to provide a process for preparation of cellulose acylate solution. In the process, a mixture of the essentially non-chlorinated solvent and the cellulose acylate having substitution degrees of acyl groups at 2- and 3-positions in total in the range of 1.70 to 1.90 and a substitution degree of acyl group at 6-position in the range of 0.88 or more is cooled at a temperature of −80° C. to −10° C. or heated at a temperature of 80° C. to 220° C., to dissolve the cellulose acylate in the solvent.

Furthermore, still yet another object of the invention is to provide a cellulose acylate film made of the cellulose acylate having substitution degrees of acyl groups at 2- and 3-positions in total in the range of 1.70 to 1.90 and a substitution degree of acyl group at 6-position in the range of 0.88 or more.

DETAILED DESCRIPTION OF INVENTION

Cellulose, which is a starting material of cellulose acylate, can be prepared from cotton linter or wood pulp. Cellulose acylate obtained from any cellulose material can be used in the invention, and cellulose acylate from a mixture of some cellulose materials is also usable. The cellulose acylate used in the invention has an acetyl group or an acyl group having 3 to 22 carbon atoms. Examples of the acyl group having 3 to 22 carbon atoms include propanoyl ($C_2H_5CO$—), butanoyl ($C_3H_7CO$—) (n-, iso-), valeroyl ($C_4H_9CO$—) (n-, iso-, sec-, tert-), octanoyl, dodecanoyl, octadecanoyl and oleoloyl. Propanoyl and butanoyl are preferred.

Cellulose triacetate is particularly preferred.

Cellulose acylate can be prepared by acylation of cellulose with an acylating agent. In the case where, acetic anhydride or acid chloride is used as the acylating agent, an organic solvent is used as a reaction solvent. Examples of the organic solvent include organic acids (e.g., acetic acid) and methylene chloride. The cellulose acylate preferably contains acyl groups substituting for hydroxyls in a substitution degree of 2.6 to 3.0. The cellulose acylate has a (viscosity average) degree of polymerization in the range of preferably 200 to 700, more preferably 250 to 550. Water content of the cellulose acylate is preferably not more than 2 wt. %.

In the cellulose acylate of the invention, the total substitution degree of acyl groups at 2- and 3-positions is in the range of 1.70 to 1.90 and the substitution degree of acyl group at 6-position is 0.88 or more.

Cellulose is composed of β-glucose units combined at 1- and 4-positions, and each glucose unit has free hydroxyls at 2-, 3- and 6-positions. A cellulose acylate is a polymer in which those hydroxyls are partly or fully esterified with acetic acid, and the substitution degree of acyl group at 2-, 3- or 6-position indicates how much cellulose is esterified at each position (namely, if cellulose is completely esterified, the substitution degree at each position is 1.00). In the cellulose acylate of the invention, the total of the substitution degrees (total substitution degree) of acyl groups at 2- and 3-positions is in the range of 1.70 to 1.90 and the substitution degree at 6-position is 0.88 or more.

If the total substitution degree at 2- and 3-positions is less than 1.70, the resultant film easily absorbs moisture to be hydrolyzed and hence to have poor durability. Further, such film considerably changes its size in absorbing moisture. In contrast, if the total substitution degree is more than 1.90, the cellulose acylate has such high affinity to an organic solvent that the dope has a high viscosity. Therefore, the total substitution degree at 2- and 3-positions is preferably in the range of 1.70 to 1.90, more preferably in the range of 1.75 to 1.88.

The inventors' study has revealed that characters of the film greatly depend upon the substitution degrees at 2- and 3-positions. In detail, if the substitution degrees at 2- and 3-positions satisfy the condition of: −0.1≦(substitution degree at 3-position)−(substitution degree at 2-position) ≦0.3, the resultant film has excellent transparency. In particular, if they satisfy the condition of: 0.0≦(substitution degree at 3-position)−(substitution degree at 2-position) ≦0.2, the transparency of the film is much more improved.

On the other hand, the substitution degree of acyl group at 6-position must be 0.88 or more. If it is less than 0.88, the solubility is considerably lowered. The reason of that is because hydroxyl at 6-position is primary while ones at 2- and 3-position are secondary, and hence it forms a hydrogen bond very easily. In consideration of the synthesis reaction, the substitution degree at 6-position is preferably in the range of 0.88 to 0.99, more preferably in the range of 0.89 to 0.98.

Japanese Patent Provisional Publication No. 11(1999)-5851 discloses a cellulose acylate in which the total of the substitution degrees at 2-, 3- and 6-positions is not less than 2.67 and the total of those at 2- and 3-positions is not less than 1.97. In consideration of optical characters of the resultant film, the total substitution degree at 2- and 3-positions is preferably more than 1.90. However, in consideration of viscosity of the dope, it is preferably 1.90 or less.

The principle of cellulose acetate synthesis is described in "Mokuzai Kagaku (Wood Chemistry, written in Japanese)", Migita et al., 1968, Kyoritsu Shuppan, pp. 180 to 190. A typical synthesis method is a liquid phase-acetylation process with a system of acetic acid anhydrideacetic acid-sulfuric acid. The process comprises the steps of: pretreating a cellulose starting material such as wood pulp with an adequate amount of organic acid, and then pouring the material into a cooled acetylation mixture so that the cellulose is completely esterified (so that the total substitution degree at 2-, 3- and 6-positions may be almost 3.00). The acetylation mixture generally comprises an organic acid as the solvent, acetic acid anhydride as the acetyl donor (esterifying agent), and sulfuric acid as the catalyst. The amount of acetic acid anhydride is usually stoichiometrically in excess of the total amount of water and cellulose to react in the system. Accordingly, after the acetylation reaction is completed, an aqueous solution of neutralizing agent (e.g., carbonates, acetates or oxides of calcium, magnesium, iron, aluminum or zinc) is added, to hydrolyze and neutralize the remaining excess acetic acid anhydride and the esterifying catalyst.

The thus-prepared cellulose acetate is kept at 50 to 90° C. in the presence of a little amount of acetylation catalyst (generally, remaining sulfuric acid) to perform saponification ripening until a cellulose acetate having aimed acetyl-substituting degree and polymerization degree is obtained. When the aimed cellulose acetate is formed, the above-described neutralizing agent is added so as to neutralize the remaining catalyst completely. Otherwise, in place of adding the neutralizing agent, the cellulose acetate solution is poured into water or diluted acetic acid (or otherwise, water or diluted acetic acid is poured into the solution) to separate the cellulose acetate, which is then washed and stabilized.

In a cellulose acylate prepared by the normal synthesis, the substitution degree at 2- or 3-position is higher than that at 0.6-position. Therefore, the aforementioned conditions of the reaction must be modified so that the total substitution degree at 2- and 3-position and the substitution degree at 6-position may be 1.90 or less and 0.88 or more, respectively. In detail, it is preferred that the amount of sulfuric acid catalyst be reduced and that the reaction time of acylation be prolonged. If a large amount of the sulfuric acid catalyst is used, a large amount of sulfate ester is accordingly produced from the catalyst, and the cellulose, although the acylation reaction proceeds rapidly. When the reaction is completed, the formed sulfate ester releases hydroxyl, which remains on the cellulose acylate. On the other hand, since hydroxyl at 6-position is relatively reactive, the sulfate ester is much produced there. As a result, if the sulfuric acid catalyst is used in a large amount, the substitution degree at 6-position is lowered. Therefore, in order to prepare the cellulose acylate of the invention, the amount of sulfuric acid catalyst must be reduced and the reaction time is prolonged to make up for slowed reaction rate.

The cellulose acylate film is preferably made of a polymer essentially comprising the above-defined cellulose acylate. The "essentially comprising" means that the polymer comprises the cellulose acylate in an amount of 90 wt. % or more (preferably 95 wt. % or more, more preferably 98 wt. % or more, most preferably 99 wt. % or more). The starting material for producing the film is preferably the cellulose acylate in the form of particles. The size of 90 wt. % or more of the particles is preferably in the range of 1 to 4 mm, and that of 50 wt. % or more is preferably in the range of 2 to 3 mm. The particles are preferably spherical.

The cellulose acylate film is preferably produced according to the solvent cast method, in which the cellulose acylate dope is used. In preparing the dope, an essentially non-chlorinated solvent is preferably used as an organic solvent. The "essentially non-chlorinated" means that a solvent containing one or more chorine atoms in its molecule (e.g., dichloromethane, dichloroethane, chlorobenzene) is contained in an amount of preferably not more than 40 vol. %, more preferably not more than 15 vol. %, further preferably not more than 5 vol. %, furthermore preferably not more than 1 vol. %, most preferably 0 vol. %.

The non-chlorinated solvent is preferably a compound having 3 to 12 carbon atoms. The solvent is also preferably a substance selected from the group consisting of esters, ethers, ketones and alcohols. The esters, ethers, ketones and alcohols may have straight chain, branched chain or cyclic structures. A compound having two or more functional groups of esters, ethers, ketones and alcohols (—COO—, —O—, —CO— and —OH) may be used.

Examples of the ester include methyl formate, ethyl formate, propyl formate, methyl acetate and ethyl acetate. Methyl formate, ethyl formate and methyl acetate are preferred, and methyl acetate is more preferred.

Examples of the ketone include acetone, methyl ethyl ketone, diethyl ketone, methyl isobutyl ketone, cyclopentanone and cyclohexanone. Acetone, cyclopentanone and cyclohexanone are preferred, and acetone and cyclopentanone are more preferred.

Examples of the ether include dibutyl ether, dimethoxymethane, diethoxyethane, 1,4-dioxane, 1,3-dioxolan, tetrahydrofuran, anisole and phenetole.

Examples of the alcohol include methanol, ethanol, 1-propanol, 2-propanol, 1-butanol, 2-butanol, cyclohexanol, 2-fluoroethanol and 2,2,2-trifluoroethanol. Methanol, ethanol, 1-propanol, 2-propanol and 1-butanol are preferred, and methanol and ethanol are more preferred.

The esters and the ketones preferably have solubility parameters of 19 to 21.

Two or more solvents may be mixed to use. An ester having a parameter of 19 to 21 and a ketone having a parameter of 19 to 21 are preferably mixed to use. In addition, an alcohol is preferably mixed with the ester and the ketone.

Examples of the combination of the solvents include methyl acetate/cyclopentanone/acetone/methanol/ethanol (60/15/15/5/5, by weight), methyl acetate/acetone/methanol/ethanol (75/15/5/5, by weight), methyl acetate/cyclohexanone/methanol/ 1-butanol (70/20/5/5, by weight), and methyl formate/methyl ethyl ketone/acetone/methanol/ethanol (50/20/20/5/5). Particularly preferred combinations are methyl acetate/acetone/methanol/ethanol (75/15/5/5, by weight) and methyl acetate/cyclopentanone/methanol/ethanol (80/10/5/5, by weight).

For preparing the cellulose acylate solution, first the cellulose acylate is added to the solvent in a tank while stirred at room temperature, so as to swell with the solvent. The time for swelling is at least 10 minutes, and if it is less than 10 minutes some insoluble residues remain. Further, for swelling the cellulose acylate well, the solvent is preferably kept at 0 to 40° C. If the temperature is lower than 0° C., the swelling speed is so slow that insoluble residues are liable to remain. On the other hand, if it is higher than 40° C., the cellulose acylate is swelled so rapidly that the inside is not fully swelled.

After swelling, the cellulose acylate is preferably dissolved according to the cooling dissolution method, the high temperature dissolution method or a combination thereof.

In the cooling dissolution method, first the cellulose acylate is gradually added into the organic solvent while stirred at room temperature (−10 to 40° C.). If two or more solvents are used, the order for addition is not restricted. For example, after the cellulose acylate is added to main solvents (e.g., esters, ketones), auxiliary solvents (e.g., alcohols) may be added. Otherwise, the cellulose acylate may be beforehand wetted with the auxiliary solvents (e.g., alcohols), and then the main solvents may be added. The amount of cellulose acylate is preferably in the range of 10 to 40 wt. % based on the amount of the mixture. The amount is more preferably in the range of 10 to 30 wt. %. Other optional additives described below may be added to the mixture.

At the next stage, the mixture is cooled to a temperature of −100 to −10° C., preferably −80 to −10° C., more preferably −50 to −20° C., and most preferably −50 to −30° C. The mixture can be cooled in a dry ice/methanol bath (−75° C.) or in a cooled diethylene glycol solution (−30 to −20° C.). The faster the cooling rate is, the more preferred it is. The cooling rate is preferably 100° C./second or more. A sealed vessel is preferably used to prevent contamination of water, which is caused by dew condensation at the cooling step.

After cooling, the mixture is warmed to a temperature of 0 to 200° C. (preferably 0 to 150° C., more preferably 0 to 120° C., most preferably 0 to 50° C.) to dissolve the cellulose acylate in the solvent. For warming the mixture, it may be left at room temperature or in a hot bath.

The time for the cooling and warming steps can be shortened by conducting the cooling step under a high pressure and conducting the warming step under a low pressure. A pressure vessel is preferably used under a high or low pressure.

The cooling and warming steps can be repeated twice or more.

In the high temperature dissolution method, the cellulose acylate is gradually added while stirred into the or ganic solvent at room temperature (−10 to 40° C.). If two or more solvents are used, the order for addition is not restricted. For example, after the cellulose acylate is added to main solvents (e.g., esters, ketones), auxiliary solvents (e.g., alcohols) may be added. Otherwise, the cellulose acylate may be beforehand wetted with the auxiliary solvents (e.g., alcohols), and then the main solvents may be added. Further, it may be beforehand swollen with the mixed organic solvent. Furthermore, it may be gradually added while stirred into one of the organic solvents at room temperature (−10 to 40° C.). In some cases, it may be beforehand swollen with a particular solvent, and then the other solvents may be mixed to prepare a homogeneous swollen mixture. It may be beforehand swollen with two or more solvents, and then the other solvents may be mixed.

The content of cellulose acylate is in the range of preferably 5 to 30 wt. %, more preferably 15 to 30 wt. %, most preferably 17 to 25 wt. %.

The cellulose acylate and the mixed solvent are heated in a pressure vessel under a high pressure of 0.2 to 30 Mpa in the temperature range of 70 to 240° C., preferably 80 to 220° C., more preferably 100 to 200° C., most preferably 100 to 190° C.

After heating, the mixture is cooled below the lowest boiling point of the used solvents. Generally, the mixture is cooled to −10 to 50° C. so that the pressure may be reduced to atmospheric pressure. For cooling the mixture, it may be left at room temperature or in a cool bath.

The warming and cooling steps can be repeated twice or more.

If necessary, first the cellulose acylate solution may be prepared in a low concentration and then concentrated. In preparing the cellulose acylate solution, the reaction vessel is preferably filled with an inert gas such as nitrogen so as to prevent explosion. Immediately before forming the film, the cellulose acylate solution is controlled to be viscous enough to form the film by casting. The viscosity is adjusted in the range of preferably 10 to 2,000 Pa·s, more preferably 30 to 400 Pa·s. The temperature in casting for forming the film is preferably in the range of −5 to 70° C., more preferably in the range of −5 to 55° C. The content of cellulose acylate in the solution is in the range of preferably 5 to 40 wt. %, more preferably 10 to 30 wt. %.

In preparing the cellulose acylate solution, various additives can be added to the solution in each step. Examples of the additives include plasticizer, ultraviolet absorber and deterioration inhibitors (e.g., oxidation inhibitor, peroxide decomposer, radical inhibitor, metal inactivating agent, oxygen scavenger, amine).

Examples of the plasticizer include triphenyl phosphate (TPP), diphenylbiphenyl phosphate, tricresyl phosphate (TCP), dioctyl phthalate (DOP), o-acetyltributyl citrate (OACTB) and acetyltriethyl citrate. Further, plasticizers reducing optical anisotropy may be used. Examples of the optical anisotropy-reducing plasticizer include (di)pentaerythritol esters (described in Japanese Patent Provisional Publication No. 11(1999)-124445), glycerol esters (described in Japanese Patent Provisional Publication No. 11(1999)-246704), diglycerol esters (described in Japanese Patent Provisional Publication No. 2000-63560), citrate esters (described in Japanese Patent Provisional Publication No. 11(1999)-92574), and substituted phenylphosphate esters (described in Japanese Patent Provisional Publication No. 11(1999)-90946). Two or more plasticizers may be used in combination. The amount of plasticizer is in the range of preferably 5 to 30 wt. %, more preferably 8 to 16 wt. % based on the amount of cellulose acylate.

The ultraviolet absorber and the deterioration inhibitor are described in Japanese Patent Provisional Publication Nos. 60(1985)-235852, 3(1991)-199201, 5(1993)-1907073, 5(1993)-194789, 5(1993)-271471, 6(1994)-107854, 6(1994)-118233, 6(1994)-148430, 7(1995)-11056, 7(1995)-11055, 8(1996)-29619, 8(1996)-239509 and 2000-204173. Examples of the deterioration inhibitor include butylated hydroxytoluene (BHT). The ultraviolet absorber is preferably excellent in absorbing ultraviolet light in the wavelength region shorter than 370 nm, and at the same time preferably absorbs less amount of visible light in the wavelength region longer than 400 nm. Examples of the ultraviolet absorber include oxybenzophenone compounds, benzotriazole compounds, salicylate ester compounds, benzophenone compounds, cyanoacrylate compounds, and nickel complex salts. Benzotriazole compounds and benzophenone compounds are preferred.

The amount of ultraviolet absorber is in the range of preferably 1 to 10,000 ppm, more preferably 10 to 1,000 ppm by weight, based on the amount of cellulose acylate.

The retardation in plane (Re) of the cellulose acylate film is preferably in the range of 0 to 300 nm. The retardation along the thickness (Rth) of the film is in the range of preferably 0 to 600 nm, more preferably 0 to 400 nm, most preferably 0 to 250 nm, per 100 $\mu$m thickness.

The cellulose acylate solution can contain, as a releasing agent, an acid having an acid dissociation constant (pKa) of 1.93 to 4.50 in water or its salt with alkali metal or alkaline earth metal. The acid or salt serves as a releasing agent.

Either inorganic or organic acids can be used as the above acid.

Examples of the inorganic acids include $HClO_2$ (2.31), HOCN (3.48), molybdic acid $H_2MoO_4$ (3.62), $HNO_2$ (3.15), phosphoric acid $H_3PO_4$ (2.15), triphosphoric acid $H_5P_3O_{10}$ (2.0) and vanadic acid $H_3VO_4$ (3.78). Each of the above numbers in parentheses represents an acid dissociation constant (pKa) of each acid in water. (In the following description, each number in parentheses also represents the acid dissociation constant (pKa) of each acid.)

Typical organic acids are carboxylic acids, sulfonic acids and phosphoric acids.

Examples of the carboxylic acids include aliphatic monocarboxylic acids, aliphatic polycarboxylic acids, oxycarboxylic acids, aldehydic acids, ketonic acids, aromatic monocarboxylic acids, aromatic polycarboxylic acids, heterocyclic monocarboxylic acids, heterocyclic polycarboxylic acids and amino acids.

Examples of the aliphatic monocarboxylic acids include formic acid (3.55), oxalacetic acid (2.27), cyanoacetic acid (2.47), phenylacetic acid (4.10), phenoxyacetic acid (2.99), fluoroacetic acid (2.59), chloroacetic acid (2.68), bromoacetic acid (2.72), iodoacetic acid (2.98), mercaptoacetic acid (3.43), vinylacetic acid (4.12), chloropropionic acid (2.71–3.92), 4-aminobutyric acid (4.03) and acrylic acid (4.26).

Examples of the aliphatic polycarboxylic acids include malonic acid (2.65), succinic acid (4.00), glutaric acid (4.13), adipic acid (4.26), pimelic acid (4.31), azelaic acid (4.39) and fumaric acid (2.85).

Examples of the oxycarboxylic acids include glycolic acid (3.63), lactic acid (3.66), malic acid (3.24), tartaric acid (2.82–2.99) and citric acid (2.87).

Examples of the aldehydic acids include glyoxylic acid (3.18).

Examples of the ketonic acids include pyruvic acid (2.26) and levulinic acid (4.44).

Examples of the aromatic monocarboxylic acids include anilinesulfonic acid (3.74–3–0.23), benzoic acid (4.20), aminobenzoic acid (2.02–3.12), chlorobenzoic acid (2.92–3.99), cyanobenzoic acid (3.60–3.55), nitrobenzoic acid (2.17–3.45), hydroxybenzoic acid (4.08–4.58), anisic acid (4.09–4.48), fluorobenzoic acid (3.27–4.14), chlorobenzoic acid, bromobenzoic acid (2.85–4.00), iodobenzoic acid (2.86–4.00), salicylic acid (2.81), naphthoic acid (3.70–4.16), cinnamic acid (3.88) and mandelic acid (3.19).

Examples of the aromatic polycarboxylic acids include phthalic acid (2.75), isophthalic acid (3.50) and terephthalic acid (3.54).

Examples of the heterocyclic monocarboxylic acids include nicotinic acid (2.05) and 2-furancarboxylic acid (2.97).

Examples of the heterocyclic polycarboxylic acids include 2,6-pyridinedicarboxylic acid (2.09).

The above-described amino acids include not only normal amino acids but also amino acid derivatives (substituted amino acids and oligopeptides). Examples of the amino acids include asparagine (2.14), aspartic acid (1.93), adenine (4.07), alanine (2.30), β-alanine (3.53), arginine (2.05), isoleucine (2.32), glycine (2.36), glutamine (2.17), glutaminic acid (2.18), serine (2.13), tyrosine (2.17), tryptophan (2.35), threonine (2.21), norleucine (2.30), valine (2.26), phenylalanine (2.26), methionine (2.15), lysine (2.04), leucine (2.35), adenosine (3.50), adenosine triphosphate (4.06), adenosine phosphate (3.65–3.80), L-alanyl-L-alanine (3.20), L-alanylglycine (3.10), β-alanylglycine (3.18), L-alanylglycylglycine (3.24), β-alanylglycylglycine (3.19), L-alanylglycylglycylglycine (3.18), glycyl-L-alanine (3.07), glycyl-β-alanine (3.91), glycylglycyl-L-alanine (3.18), glycylglycylglycine (3.20), glycylglycylglycylglycine (3.18), glycylglycyl-L-histidine (2.72), glycylglycylglycyl-L-histidine (2.90), glycyl-DL-histidylglycine (3.26), glycyl-L-histidine (2.54), glycyl-L-leucine (3.09), γ-L-glutamyl-L-cysteinylglycine (2.03), N-methylglycine (sarcosine, 2.20), N,N-dimethylglycine (2.08), citrulline (2.43), 3,4-dihydroxyphenylalanine (2.31), L-histidylglycine (2.84), L-phenylalanylglycine (3.02), L-prolylglycine (3.07) and L-leucyl-L-tyrosine (3.15).

Sulfonic and phosphoric materials can be also used as the releasing agent.

Surface-active agents (described in Japanese Patent Provisional publication No. 61(1986)-243837) can be also used as the releasing agent. Examples of the surfaceactive agent used as the releasing agent include $C_{12}H_{25}O-P(=O)-(OK)_2$, $C_{12}H_{25}OCH_2CH_2O-P(=O)-(OK)_2$ and (iso-$C_9H_{19})_2-C_6H_3-O-(CH_2CH_2O)_3-(CH_2)_4SO_3Na$.

As the acid, a polycarboxylic acid derivative is particularly preferred.

The polycarboxylic acid derivative preferably contains a carboxyl group having an acid dissociation constant (pKa) of 4.4 or less (at 25° C.) or a salt thereof. The acid dissociation constant (pKa) of carboxyl group is preferably in the range of 1.9 to 4.4, more preferably in the range of 2.0 to 4.0, further preferably in the range of 2.0 to 3.9. If so, the resultant film has a good surface. Further, the cellulose acylate solution containing such derivative is preferred in consideration of productivity, because it can be easily peeled from a metal support after cast onto the support. The carboxyl group may be in the form of a salt. In detail, the polycarboxylic acid-derivative containing the preferred carboxyl group or a salt thereof is preferably a hydrocarbon polycarboxylic ester, a hydrocarbon polycarboxylic amide, an aromatic polycarboxylic ester, an aromatic polycarboxylic amide or a hetrocyclic polycarboxylic amide.

A hydrocarbon polycarboxylic acid from which the polycarboxylic acid derivative is derived may be substituted or non-substituted. Examples of the hydrocarbon polycarboxylic acid include oxalic acid (1.27), malonic acid (pKa: 2.65), succinic acid (4.00), glutaric acid (4.13), adipic acid (4.26), pimelic acid (4.31), azelaic acid (4.39), fumaric acid (2.85), malic acid (3.24), tartaric acid (2.82–2.99), citric acid (2.87); aromatic polycarboxlic acids such as phthalic acid (2.75), isophthalic acid (3.50), terephthalic acid (3.54), trimellitic acid and 4-methyl phthalic acid; and heterocyclic polycarboxylic acids such as 2,6-pyridinedicarboxylic acid (2.09). As the organic solvent, amino acids are also usable. Examples of the amino acids include aspartic acid (1.93) and glutaminic acid (2.18). The aliphatic polycarboxylic acids such as malonic acid, succinic acid, glutaric acid, fumaric acid, malic acid and citric acid are preferred.

The ester or amide group of the aforementioned preferred compound is modified to prepare the polycarboxylic acid derivative. The ester group is preferably a substituted or non-substituted alkyl, alkenyl or allyl group having 1 to 200 carbon atoms, preferably 1 to 100 carbon atoms, more preferably 1 to 50 carbon atoms. The alkyl, alkenyl or allyl group is preferably substituted with a (poly)oxyalkylene group, which is particularly preferably a poly(oxyethylene) group, a (poly)oxypropylene group, a (poly)oxybutylene group or a (poly)oxyglyceric group. The amide derivative, which is a preferred embodiment of the polycarboxylic acid derivative, may be primary, secondary or tertially, and it also may be either substituted or non-substituted. If it is substituted, the substituent group is preferably an alkyl, alkenyl or allyl group having 1 to 200 carbon atoms, preferably 1 to 100 carbon atoms, more preferably 1 to 50 carbon atoms. The alkyl, alkenyl or allyl group is preferably substituted with a (poly)oxyalkylene group, which is particularly preferably a poly(oxyethylene) group, a (poly)oxypropylene group, a (poly)oxybutylene group or a (poly)oxyglyceric group.

The above acids may be in the form of free acids or salts with alkali metals, alkaline earth metals or heavy metals. Examples of the alkali metals include lithium, potassium and sodium. Examples of the alkaline earth metals include calcium, magnesium, barium and strontium. Examples of the heavy metals or transition metals include aluminum, zinc, tin, nickel, iron, lead, copper and silver. Substituted or non-substituted amines having 5 or less carbon atoms are also preferred. Examples of the amines include ammonium, methyl amine, ethyl amine, propyl amine, butyl amine, dimethyl amine, trimethyl amine, triethyl amine, hydroxyethyl amine, di(hydroxyethyl) amine and tri(hydroxyethyl) amine. Preferred alkali metals include sodium, and preferred alkaline earth metals include calcium and magnesium. The alkali metals or alkaline earth metals can be used singly or in combination. Both alkali metals and alkaline earth metals can be used in combination. The total amount of the acids or salts thereof is determined so as to realize satisfying releasing, enough transparency and preferable film-formability. For example, the amount is in the range of $1 \times 10^{-9}$ to $3 \times 10^{-5}$ mol, preferably $1 \times 10^{-8}$ to $2 \times 10^{-5}$ mol (e.g., $5 \times 10^{-7}$ to $1.5 \times 10^{-5}$ mol), more preferably $1 \times 10^{-7}$ to $1 \times 10^{-5}$ mol (e.g., $5 \times 10^{-6}$ to $8 \times 10^{-6}$ mol) based on 1 g of the cellulose acylate. It is normally in the range of $5 \times 10^{-7}$ to $5 \times 10^{-6}$ mol (e.g., $6 \times 10^{-7}$ to $3 \times 10^{-6}$ mol). Examples of particularly preferred polycarboxylic acid derivatives are shown below, but they by no means restrict the invention.

RK-1: $HOOC(CH_2)_kCO(OCH_2CH_2)_mOR$; $R=CH_3$, $k=0$, $m=6$

RK-2: $HOOC(CH_2)_kCO(OCH_2CH_2)_mOR$; $R=C_4H_9$, $k=0$, $m=10$

RK-3: $HOOC(CH_2)_kCO(OCH_2CH_2)_mOR$; $R=C_2H_5$, $k=1$, $m=5$

RK-4: $HOOC(CH_2)_kCO(OCH_2CH_2)_mOR$; $R=C_8H_{17}$, $k=2$, $m=10$

RK-5: $HOOC-CH_2CH(OH)-COOR$; $R=CH_3$

RK-6: $HOOC-CH_2CH(OH)-COOR$; $R=(CH_2CH(OH)-CH_2O)_5H$

RK-7: $HOOC-CH_2CH(OH)-COOR$; $R=(CH_2CH_2O)_5-OC_4H_9$

RK-8: $HOOC-CH(OH)-CH(OH)-COOR$; $R=(CH_2CH_2O)_3-OC_4H_9$

RK-9: $HOOC-CH(OH)-CH(OH)-COOR$; $R=(CH_2CH_2O)_{10}-OC_4H_9$

RK-10: $HOOC-CH(OH)-CH(OH)-COOR$; $R=(CH_2-CH(CH_3)-CH_2O)_3-(CH_2CH_2O)_5H$

RK-11: mono{ethoxy-tri(ethyleneglycol)} citrate ester

RK-12: di{butoxy-hexa(ethyleneglycol)} citrate ester

RK-13: di{ethoxy-tri(ethyleneglycol)} citrate ester

RK-14: mono{ethoxy-penta(ethyleneglycol)} phthalate ester

RK-15: mono{dodecyloxy-deca(ethyleneglycol)} isophthalate ester

RK-16: di{butoxy-penta(ethyleneglycol)} trimellitate ester

RK-17: mono{butoxy-hepta(ethyleneglycol)} N-acetylaspartate ester
RK-18: mono{ethoxy-penta(ethyleneglycol)} 2,6-pyridinedicarboxylate ester
RK-19: mono{penta(ethyleneglycol)} 2,6-pyridine-dicarboxylate ester
RK-20: methyl tartrate ester
RK-21: dimethyl citrate ester
RK-22: HOOC—CH=CH—COO($CH_2CH_2$)$_7$—$C_2H_9$
RK-23: HOOC—$CH_2$—$CONR_1.R_2$; $R_1$=H, $R_2$=($CH_2CH_2O$)$_5$H
RK-24: HOOC—$CH_2$—$CONR_1.R_2$; $R_1$=$R_2$=($CH_2CH_2O$)$_5$H
RK-25: HOOC—CH(OH)—$CH_2$CONH($CH_2CH_2O$)$_5$H
RK-26: HOOC—CH(OH)—$CH_2$CON{($CH_2CH_2O$)$_3$H}$_2$
RK-27: HOOC—CH(OH)—CH(OH)—CON{($CH_2CH_2O$)$_5$H}$_2$H
RK-28: mono{N-octa(ethyleneglycol)} citric amide
RK-29: mono{N-butoxydeca(ethyleneglycol)} terephthalic amide
RK-30: NaOOC($CH_2$)$_k$CO(O$CH_2CH_2$)$_m$OR; R=$C_2H_5$, k=0, m=15
RK-31: KOOC($CH_2$)$_k$CO(O$CH_2CH_2$)$_m$OR; R=$C_4H_9$, k=0, m=10
RK-32: Ca{OOC($CH_2$)$_k$CO(O$CH_2CH_2$)$_m$OR}2; R=$C_2H_5$, k=1, m=5
RK-33: $NH_3$OOC—$CH_2$CH(OH)—COOR; R=$CH_3$
RK-34: LiOOC—$CH_2$CH(OH)—COOR; R=$CH_2$CH(OH)$CH_2O$)$_5$H
RK-35: Mg{OOC—CH(OH)—CH(OH)—COOR}$_2$; R=($CH_2CH_2O$)$_3$—$OC_4H_9$
RK-36: Na salt of mono{ethoxy-tri(ethyleneglycol)} citrate ester
RK-37: Na salt of di{butoxy-hexa(ethyleneglycol)} citrate ester
RK-38: K salt of di{ethoxy-tri(ethyleneglycol)} citrate ester
RK-39: Na salt of mono{ethoxy-penta(ethyleneglycol)} phthalate ester
RK-40: Li salt of di{butoxy-penta(ethyleneglycol)} trimellitate ester
RK-41: Na salt of dimethyl tartrate ester
RK-42: trihydroxyethylamine salt of dimethyl citrate ester
RK-43: NaOOC—CH=CH—COO($CH_2CH_2$)$_7$—$C_2H_9$
RK-44: NaOOC—CH(OH)—$CH_2$CONH($CH_2CH_2O$)$_5$H
RK-45: KOOC—CH(OH)—$CH_2$CON{($CH_2CH_2O$)$_3$H}$_2$
RK-46: Na salt of di{N-octa(ethyleneglycol)} citric amide The acids may be in the form of not free acids but salts with alkali metals or alkaline earth metals. Examples of the alkali metals include lithium, potassium and sodium. Sodium is particularly preferred. Examples of the alkaline earth metals include calcium, magnesium, barium and strontium. Calcium and magnesium are particularly preferred. Alkali metals are preferred to alkaline earth metals. Two or more alkali metals or alkaline earth metals can be used in combination. Both alkali metals and alkaline earth metals can be used in combination.

The total amount of the acids or metal salts is determined so as to realize satisfying releasing and enough transparency. The amount is in the range of preferably $1\times10^{-9}$ to $3\times10^{-5}$ mol, more preferably $1\times10^{-8}$ to $2\times10^{-5}$ mol, further preferably $1\times10^{-7}$ to $1.5\times10^{-5}$ mol, furthermore preferably $5\times10^{-7}$ to $1\times10^{-5}$ mol, most preferably $6\times10^{-7}$ to $8\times10^{-6}$ mol, based on 1 g of the cellulose acylate.

In order to reduce friction of the resultant film, fine particles (matting agent) may be added. As the fine particles, inorganic materials are preferred. Examples of the inorganic materials for the fine particles include silica, kaolin, talc, diatomaceous earth, quartz, calcium carbonate, barium sulfate, titanium oxide, alumina, manganese colloid, titanium dioxide, strontium barium sulfate and silicon dioxide. The inorganic particles may be prepared from salts of alkaline earth metals (e.g., calcium, magnesium). The particles form fine projections on the film to make the surface rough, and the average height of the projections is in the range of preferably 0.005 to 10 µm, more preferably 0.01 to 5 µm. The projections can be made of the matting agent of spherical or irregular particles. The amount of the fine particles is in the range of preferably 0.5 to 600 mg/m$^2$, more preferably 1 to 400 mg/m$^2$.

Before casting, the cellulose acylate solution (dope) is preferably filtrated through a proper filter (e.g., wire net, paper, flannel) to remove foreign substances (precipitated or suspended excess solute, dregs, impurities). The filter preferably has an absolute filtration precision of 0.05 to 100 µm, more preferably 0.5 to 10 µm. The pressure for filtration is in the range of preferably not more than 16 kg/cm$^2$, more preferably not more than 12 kg/cm$^2$, further preferably not more than 10 kg/cm$^2$, and most preferably not more than 2 kg/cm$^2$.

The cellulose acylate film can be prepared by the conventional process and apparatus for the preparation of cellulose acylate film according to the solvent cast method. For example, first the dope (cellulose acylate solution) prepared in a dissolving tank (pot) is introduced into a stock tank to defoam. The thus finally prepared dope is then sent from an outlet to a pressure die through a quantitative gear pump of pressing type, which can quantitatively send the liquid very preciously, for example, according to rotation of the gear. From a slit of the pressure die, the dope is evenly cast on a support running endlessly. When the endless support once rotates and a beforehand determined peeling point is seen, the insufficiently dried dope film (which is referred to as "web") is peeled from the support. While both sides of the web are fixed with clips to keep the width, the web is transferred and dried with a tenter. The web is then successively dried and transferred with rollers of a drying means to complete drying, and wound up by a winder in a predetermined length. The combination of the tenter and the rollers of drying means varies according to the aims of the film. In the case where the film used for a silver halide photographic material or a protective film of electric display is prepared by the solvent cast method, not only the above solvent cast apparatus but also a coating means for providing an undercoating layer, an antistatic layer, an anti-halation layer and a protective layer is often used.

The prepared cellulose acylate solution is cast on a smooth band or drum (support). Two or more cellulose acylate solutions may be successively or cooperatively (simultaneously) cast to form two or more layers. For example, two or more outlets are arranged at intervals along the running direction of the support, and from each outlet each cellulose acylate solution is cast to form a layered film (Japanese Patent Provisional Publication No. 11(1999)-198285). Otherwise, cellulose acylate solutions may be cast from two outlets to form a film (Japanese Patent Provisional Publication No. 6(1994)-134933). Further, a flow of high-viscous cellulose acylate solution may be enclosed with a flow of low-viscous one to form a layered flow, and the high- and low-viscous solutions in the layered flow may be simultaneously extruded to produce a film (Japanese Patent Provisional publication No. 56(1981)-162617). Through the cooperative casting process, the surface of the film is dried to be smooth and consequently the resultant film has a considerably improved surface. The thickness of each layer formed by cooperative casting is not particularly restricted, but preferably the surface layer is thinner than inner layers. The surface layer has a thickness of preferably 1 to 50 μm, more preferably 1 to 30 μm. Here, the term "surface layer" means a layer not facing the band (or drum) in a two-layered film, or the top or bottom layer in a three- or more-layered film. The term "inner layer" means a layer facing the band (or drum) in a two-layered film, or the layer positioned inside in a three- or more-layered film.

The cellulose acylate solution can be cast simultaneously with coating solutions for other functional layers (e.g., adhesive layer, dye layer, antistatic layer, anti-halation layer, UV absorbing layer, polarizing layer).

The dope cast on the support is dried at a temperature of preferably 30 to 250° C., more preferably 40 to 180° C. The temperature for drying is described in Japanese Patent Publication No. 5(1993)-17844. The film may be laterally stretched (according to the description in Japanese Patent Provisional publication Nos. 62(1987)-115035, 4(1992)-152125, 4(1992)-284211, 4(1992)-298310 and 11(1999)-48271). When the film is stretched, monoaxial or biaxial stretching is carried out. The stretching ratio (ratio of the extended length to the original length) is preferably in the range of 10 to 30%.

The resultant (dried) film has a thickness of preferably 5 to 500 μm, more preferably 20 to 250 μm, most preferably 30 to 180 μm. If the film is used for an optical device, the thickness is particularly preferably in the range of 30 to 110 μm. The thickness can be controlled by adjusting the solid content of the dope, the width of the die slit, the extruding speed from the die, and the moving speed of the support.

The cellulose acylate film may be subjected to surface treatment to improve adhesion between each functional layer (e.g., adhesive layer, backing layer) and the film. Examples of the surface treatment include glow discharge treatment, corona discharge treatment, ultraviolet (UV) treatment, flame treatment, and acid or alkali treatment). The acid or alkali treatment is preferred, and the alkali treatment is more preferred. Through the acid or alkali treatment, the cellulose acylate film is saponified.

The alkali saponification treatment preferably comprises the steps of immersing the film surface in an alkali solution, neutralizing with an acidic solution, washing with water and drying. Examples of the alkali solution include aqueous solutions of potassium hydroxide and sodium hydroxide. The normality of hydroxide ion is in the range of preferably 0.1 to 3.0 N, more preferably 0.5 to 2.0 N. The temperature of the alkali solution is in the range of preferably room temperature to 90° C., more preferably 30 to 70° C. After immersed in the alkali solution, the film is generally washed with water and immersed in an acidic solution. The cellulose acylate film is then washed with water to complete the surface treatment. Examples of the acid include hydrochloric acid, nitric acid, sulfuric acid, acetic acid, formic acid, chloroacetic acid and oxalic acid. The normality thereof is in the range of preferably 0.01 to 3.0 N, more preferably 0.05 to 2.0 N. In order to ensure adhesion between the cellulose acylate film and the functional layers, an undercoating layer (adhesive layer) is preferably provided on the film before the functional layers are provided thereon.

In the case where the cellulose acylate film is used as a protective film of polarizing plate, the film preferably has at least one antistatic layer containing electrically conductive material or a hydrophilic binder layer for adhesion onto the polarizer. As the conductive material, conductive metal oxides or polymers are preferred. Further, a transparent conductive membrane may be formed by vapor deposition or sputtering. The conductive layer (antistatic layer) may be the surface layer or the inner layer. The conductive layer has a resistance of preferably $10^0$ to $10^{12}$ Ω, more preferably $10^0$ to $10^{10}$ Ω. As the conductive material, metal oxides are preferred. Examples of the metal oxides include $ZnO$, $TiO_2$, $SnO_2$, $Al_2O_3$, $In_2O_3$, $SiO_2$, $MgO$, $BaO$, $MoO_2$, $V_2O_5$ and complex oxides. Preferred oxides are $ZnO$, $SnO_2$ and $V_2O_5$. Examples of the conductive ionic polymer include an anionic polymer having dissociating groups at the main chain and a cationic polymer of pendant type having cationic dissociating groups at the side chain. As the conductive material, organic electrically conductive material is preferred. Examples of the electrically conductive material include polyaniline derivatives, polythiophene derivatives, polypyrrole derivatives and polyacetylene derivatives.

A surface-active agent is preferably contained in one or more of the functional layers on the cellulose acylate film. As the surface-active agent, a nonionic, cationic or betaine surface-active agent is preferred. A fluorine-containing surface-active agent is also usable. The surface-active agent in the organic solvent can work as a coating agent or an antistatic agent.

A slipping agent is preferably contained in one or more of the layers on the cellulose acylate film. Examples of the slipping agent include polyorganosiloxane (described in Japanese Patent Publication No. 53(1978)-292), amides of higher fatty acids (described in U.S. Pat. No. 4,275,146), and esters of higher fatty acids (described in British Patent No. 927,446, Japanese Patent Publication No. 58(1983)-33541 and Japanese Patent Provisional Publication Nos. 55(1980)-126238 and 58(1983)-90633). The above esters of higher fatty acids are esters derived from fatty acids having 10 to 24 carbon atoms and alcohols having 10 to 24 carbon atoms.

The cellulose acylate film prepared from the cellulose acylate solution has various uses.

The cellulose acylate film is particularly suitable for an optical compensatory sheet in a liquid crystal display. The cellulose acylate film itself can be directly used as the optical compensatory sheet. In that case, the polarizing element (described below) and the compensatory sheet of cellulose acylate film are preferably placed so that the transparent axis of the element is essentially parallel or perpendicular to the slow axis of the sheet. The placement of the element and the sheet is described in Japanese Patent Provisional Publication No. 10(1998)-48420. The liquid crystal display comprises two polarizing elements and a liquid crystal cell provided between them. The liquid crystal cell comprises a pair of electrode substrates and a liquid crystal layer placed between them. In the display, at least one optical compensatory sheet is placed between the liquid crystal cell and the polarizing element. For forming the liquid crystal layer in the cell, some spacers are usually placed between the two substrates to make a space, in which liquid crystal molecules are enclosed. The electrode substrate is a substrate on which a transparent electrode layer containing electrically conductive material is provided. Further, the liquid crystal cell may have a gas-barrier layer, a hard coating layer or an undercoating layer (for adhesion to the transparent electrode layer). These layers are usually provided on the substrate. The substrate generally has a thickness of 80 to 500 μm.

The optical compensatory sheet is a birefringent film for preventing a displayed image from undesirable coloring. The cellulose acylate film can be used as the optical compensatory sheet, which may serve as an antireflection layer, an antiglare layer, a λ/4 layer and/or a biaxially stretched cellulose acylate film. Further, in order to enlarge a viewing angle of the liquid crystal display, the cellulose acylate film can be laminated on a film having birefringence opposite (in relation to positive/negative) to that of the cellulose acylate film, to prepare the optical compensatory sheet. The thickness of the compensatory sheet is preferably in the above-described range of preferred thickness of the film.

Examples of the polarizing membrane in the polarizing element include an iodine polarizing membrane, a polyene polarizing membrane and a dichromatic dye polarizing membrane. Each membrane is generally made of polyvinyl alcohol. The protective film of the polarizing plate has a thickness of preferably 25 to 350 μm, more preferably 30 to 200 μm.

The liquid crystal display may have a surface-treated layer, which may function as a hard coating layer, an antifogging layer and an anti-reflection layer. As described above, an optical compensatory sheet in which an optically anisotropic layer-containing liquid crystal molecules (particularly, discotic ones) is provided on a support is proposed (in Japanese Patent Provisional Publication Nos. 3(1991)-9325, 6(1994)-148429, 8(1996)-50206 and 9(1997)-26572). The cellulose acylate film can be also used as the support of such optical compensatory sheet.

The cellulose acylate film is advantageously used as the support of the optical compensatory sheet for a liquid crystal display, which may be a VA type having a liquid crystal cell of VA mode, an OCB type having a liquid crystal cell of OCB mode, a HAN type having a liquid crystal cell of HAN mode or an ASM (axially symmetric aligned microcell) type having a liquid crystal cell of ASM mode.

In the below-described examples, chemical and physical properties of the prepared cellulose acylate solutions and films were measured or estimated in the following manners.

(1) Substitution Degree (%) of Cellulose Acylate

The acetic acid content was measured according to the saponification method. The sample of dried cellulose acylate was preciously weighed out, and dissolved in a mixed solvent of acetone and dimethyl sulfoxide (4:1, by volume). A certain amount of 1 N-sodium hydroxide aqueous solution was added to the solution, and thereby the cellulose acylate in the solution was saponified at 25° C. for 2 hours. After phenolphthalein as an indicator was added, the excess sodium hydroxide was titrated with 1 N-sulfuric acid (concentration factor: F). Independently, a blank test was carried out in the same manner. From the obtained data, the acetic acid content (%) was calculated according to the formula:

Acetic acid content=$\{6.005 \times (B-A) \times F\}/W$.

In the formula, A is the amount (ml) of 1 N-sulfuric acid used in the titration, B is the amount (ml) of 1 N-sulfuric acid used in the blanc test, F is the concentration factor of 1 N-sulfuric acid, and W is the weight of the sample.

In the case where the cellulose acylate contains two or more kinds of acyl groups, the amount of each group was estimated in consideration of differences among the pKa values. Independently, the amount was measured by another method (described in T. Sei, K. Ishitani, R. Suzuki, K. Ikematsu, Polymer Journal, 17, 1065(1985)), and compared with the above-obtained value to confirm that it was correct.

From the obtained acetic acid content and the amounts of other acyl groups, the substitution degree was calculated in consideration of molecular weight.

Further, the cellulose acylate was acylated with other acyl groups, and then the substitution degrees of acyl groups at 2-, 3- and 6-positions were measured by means of $^{13}$C-NMR according to the method described in Carbohydr. Res. 273 (1995) 83–91 (Yedzuka et al.).

(2) Viscosity Average Degree of Polymerization (DP) of Cellulose Acylate

About 0.2 g of absolutely dried cellulose acylate was preciously weighed out, and dissolved in 100 ml of a mixed solvent of methylene chloride and ethanol (9:1, by weight). The dropping time of the solution was measured at 25° C. by means of Ostwald's viscosity meter, and thereby the degree of polymerization was calculated according to the following formulas:

$\eta rel = T/T0$ $[\eta] = (ln\ \eta rel)/C$ $DP = [\eta]/Km$ in which
T: dropping time of the sample (second),
T0: dropping time of the solvent alone (second),
C: concentration (g/l), and
Km: $6 \times 10^{-4}$.

(3) Stability of Solution

The prepared solutions or slurries were left at room temperature (23° C.) for 20 days, and observed and classified into the following four grades A, B, C and D:
A: transparent and homogeneous,
B: slightly clouded, or a little amount of excess solute was seen,
C: gelled, or a considerable amount of excess solute was seen, and
D: not swelled and the solute was not dissolved, and the sample was opaque and inhomogeneous.

(4) Viscosity of Solution

The viscosities of the prepared solutions were measured at 40° C. by means of a Rheometer (TA Instruments).

(5) Surface of Film

The prepared films were observed to check the state of the surface. According to the observation, the prepared films were classified into the following four grades:
A: the surface was smooth and even,
B: the surface was almost smooth, but unevenness was observed a little,
C: the surface was almost smooth, but weak unevenness was frequently observed,
D: weak unevenness was seen all over the surface, and
E: considerable unevenness was seen, and there were dregs on the surface.

(6) Haze of Film

The haze of each prepared film was measured by means of a haze meter (1001DP type, Nippon Denshoku KK).

(7) Peeling of Film from Support

After each prepared film was peeled from the support, the surface of the support was observed to check whether flakes of the cellulose acylate film remained or not. According to the observation, the prepared films were classified into the following four grades:
A: no flake of the film was observed,
B: a few flakes of the film were observed,
C: some flakes of the film were observed, and
D: many flakes of the film were observed.

(8) Lateral Unevenness (Simply Referred to as "Unevenness") of Film

The prepared films were observed to check defects of lateral unevenness. According to the observation, the prepared films were classified into the following four grades:

A: no defect of lateral unevenness was observed,
B: a few defects of lateral unevenness were observed,
C: some defects of lateral unevenness were observed, and
D: many defects of lateral unevenness were observed.

(9) Warts on Film (Simply Referred to as "Warts")

The prepared films were observed to check warts on the surface. According to the observation, the prepared films were classified into the following four grades:
A: no wart was observed on the surface,
B: a few warts were observed on the surface,
C: some warts were observed on the surface, and
D: many warts were observed on the surface.

EXAMPLE 1

(1-1) Preparation of Cellulose Acylate Solution

Cellulose acylate solutions were prepared according to the following two methods. The components of the solution prepared in each example or comparison example were shown in Table 1 in detail. To each solution, silica particles (size: 20 nm), triphenylphosphate/biphenyldiphenylphosphate (1/2) and 2,4-bis-(n-octylthio)-6-(4-hydroxy-3,5-di-tert-butylanilino)-1,3,5-triazine were added in the amounts of 0.5 wt. %, 10 wt. % and 1.0 wt. %, respectively, based on the amount of cellulose acylate. Further, citric acid was added as a releasing agent in the amount of 200 ppm based on the amount of cellulose acylate. An inner layer and an outer layer were formed from the thus prepared cellulose acylate solutions having different concentrations. Those conditions were also shown in Table 1 in detail.

(1-1a) Cooling Dissolution Method (Represented by "Cool" in Table 1)

To the solvent, each cellulose acylate shown in Table 1 was gradually added while stirred. The mixture was left at room temperature (25° C.) for 3 hours to swell. While moderately stirred, the swelled mixture was cooled to −30° C. at the rate of −8° C./minute and then further cooled to the temperature shown in Table 1. After kept at the temperature for 6 hours, the mixture was heated at the rate of +8° C./minute. When the mixture became a sol in a certain degree, it was started to stir the sol. The mixture was then heated to 50° C. to prepare a dope.

(1-1b) High Temperature-high Pressure Dissolution Method (Represented by "Heat" in Table 1)

To the solvent, each cellulose acylate shown in Table 1 was gradually added while stirred. The mixture was left at room temperature (25° C.) for 3 hours to swell. The swelled mixture was placed in a stainless steel-made air-tight container having a dual structure. Highly pressured steam was led to the outer jacket of the container, and thereby the mixture was heated at the rate of +8° C./minute to the temperature shown in Table 1 and kept at the temperature for 5 minutes under 1 Mpa. Water at 50° C. was then led to the outer jacket to cool the mixture at the rate of −8° C./minute to 50° C. Thus, a dope was prepared.

(1-2) Filtration of Cellulose Acylate Solution

The prepared dope was filtrated at 50° C. through filter paper having the absolute filtration precision of 0.01 mm (#63, Toyo Filter Co., Ltd.), and then further filtrated through filter paper having the absolute filtration precision of 0.0025 mm (FHO25, Pole).

(1-3) Production of Cellulose Acylate Film

The dope of (1-2) was cast by means of a casting machine described in Japanese Patent Provisional Publication No. 56(1981)-162617, and dried at 120° C. for 30 minutes. The formed film consisted of two or three layers. The two-layered film comprised an inner layer and an outer layer overlaid in order from the band support, while the three-layered one has a sandwiched structure of an outer layer/an inner layer/another outer layer. The details are shown in Table 1.

TABLE 1

| | Cellulose acylate | | | | | |
|---|---|---|---|---|---|---|
| | Acetyl | C3 to C22 acyl | | | Degree | Degree |
| | Degree (A) | Acyl (1) | Degree (B) | DP | at 2 and 3 (C) | at 6 (D) |
| Exp. 1 | 2.77 | — | 0 | 310 | 1.88 | 0.89 |
| Exp. 2 | 2.47 | Pr | 0.3 | 370 | 1.82 | 0.95 |
| Exp. 3 | 2.65 | Bt | 0.1 | 440 | 1.77 | 0.98 |
| Exp. 4 | 2.64 | Bt | 0.11 | 440 | 1.77 | 0.98 |
| Comp. Ex. 1 | 2.42 | Bt | 0.12 | 400 | 1.70 | 0.84 |
| Comp. Ex. 2 | 2.66 | Bt | 0.11 | 400 | 1.97 | 0.80 |
| Comp. Ex. 3 | 2.73 | Bt | 0.11 | 390 | 1.94 | 0.90 |

Remarks:
(1) Pr: propionyl, Bt: butylyl
(A) Degree of acetyl substitution
(B) Degree of C3 to C22 acyl substitution
(C) Degree of substitution at 2- and 3-positions
(DO) Degree of substitution at 6-positon

| | | | Solvents (2) | | |
|---|---|---|---|---|---|
| | Dissolutaion | | Non- | | |
| | Method | Temperature | chlorinated = wt. % | Chlorinated = wt. % | Alcohol = wt. % |
| Exp. 1 | Cool | −70° C. | MA/CH = 80/15 | None | MOL = 5 |
| Exp. 2 | Cool | −70° C. | MA/CP = 60/30 | None | MOL/POL = 5/5 |

TABLE 1-continued

| | | | | | |
|---|---|---|---|---|---|
| Exp. 3 | Heat | 160° C. | MA/AC = 75/10 | MC = 5 | MOL/EOL = 5/5 |
| Exp. 4 | Heat | 160° C. | None | MC = 90 | MOL/EOL = 5/5 |
| Comp. Ex. 1 | Heat | 160° C. | MA/AC = 75/10 | MC = 5 | MOL/EOL = 5/5 |
| Comp. Ex. 2 | Heat | 160° C. | None | MC = 90 | MOL/EOL = 5/5 |
| Comp. Ex. 3 | Heat | 160° C. | None | MC = 90 | MOL/EOL = 5/5 |

Remarks:
(2) MA: methyl acetate,  CH: cyclohexane,
AC: acetone,  AA: methyl acetocetate,
CP: cyclopentanone,  MC: dichloromethane,
MOL: methanol,  EOL: ethanol.
POL: 1-propanol,  CT: carbon tetrachloride,
HP: n-hepatene

| | No. of layers | Concentration (3) of coating solutions and dry thickness | |
|---|---|---|---|
| | | Inner layer | Outer layer(s) |
| Exp. 1 | 1 | 18.0 wt. % (90 μm) | |
| Exp. 2 | 2 | 19.0 wt. % (30 μm) | 18.5 wt.% (50 μm) |
| Exp. 3 | 3 | 20.0 wt. % (50 μm) | 19.8 wt.% (20 + 20 μm) |
| Exp. 4 | 3 | 20.0 wt. % (50 μm) | 19.8 wt.% (20 + 20 μm) |
| Comp. Ex. 1 | 3 | 20.0 wt. % (50 μm) | 19.8 wt.% (20 + 20 μm) |
| Comp. Ex. 2 | 3 | 20.0 wt. % (50 μm) | 19.8 wt.% (20 + 20 μm) |
| Comp. Ex. 3 | 3 | 20.0 wt. % (50 μm) | 19.8 wt.% (20 + 20 μm) |

Remarks:
(3) Weight percent of cellulose acylate per the total weight percent (1-4) Results The prepared cellulose acylate solutions and films were evaluated in the aforementioned manners. The results were set forth in Table 2, and it was confirmed that the solutions and films of the invention had no problem with respect to stability of the solution, and mechanical and optical characters of the film. On the other hand, there were some defects on the surface of the films for comparison.

Further, the films were subjected to MD or TD stretching by 10 to 30% at 130° C. online in the drying step of the production process or offline after the step, and thereby the retardation could be increased by 40 to 160 nm in proportion to the stretching ratio.

It was further confirmed that the prepared cellulose acylate films were advantageously used in a liquid crystal display described in Example 1 of Japanese Patent Provisional Publication No. 10(1998)-48420, a discotic liquid crystal-containing optically anisotropic layer described in Example 1 of Japanese Patent Provisional Publication No. 9(1997)-26572, an orientation layer coated with polyvinyl alcohol, a liquid crystal display of VA type shown in FIGS. 2 to 9 of Japanese Patent Provisional Publication No. 2000-154261, and a liquid crystal display of OCB type shown in FIGS. 10 to 15 of Japanese Patent Provisional Publication No. 2000-154261. The film were also advantageously used as a polarizing plate described in Japanese Patent Provisional Publication No. 54(1979)-016575.

TABLE 2

| | Stability of dope | Film surface | Viscosity at 40° C. (P · s)* | Haze (%) |
|---|---|---|---|---|
| Exp. 1 | A | A | 400 | 0.1 |
| Exp. 2 | A | A | 430 | 0.1 |
| Exp. 3 | A | A | 410 | 0.1 |
| Exp. 4 | A or B | A or B | 590 | 0.1 |
| Comp. Ex. 1 | B | C | 950 | 0.4 |
| Comp. Ex. 2 | A or B | D | 1,150 | 0.6 |
| Comp. Ex. 3 | A | B | 850 | 0.3 |

Remarks:
*In consideration of production, the viscosity of dope is preferably 800 Pa · s or less at 40° C.

EXAMPLE 2

(1-1) Preparation of Cellulose Acylate Solution

Cellulose acylate solutions were prepared according to the following two methods. The components of the solution prepared in each example or comparison example were shown in Table 3 in detail. To each solution, silica particles (size: 20 nm), triphenylphosphate/biphenyldiphenylphosphate (1/2) and 2,4-bis-(n-octylthio)-6-(4-hydroxy-3,5-di-tert-butylanilino)-1,3,5-triazine were added in the amounts of 0.5 wt. %, 10 wt. % and 1.0 wt. %, respectively, based on the amount of cellulose acylate. Further, citric acid was added as a releasing agent in the amount of 200 ppm based on the amount of cellulose acylate. An inner layer and an outer layer were formed from the thus prepared cellulose acylate solutions having different concentrations. Those conditions were also shown in Table 3 in detail.

(1-1a) Cooling Dissolution Method (Represented by "Cool" in Table 3)

To the solvent, each cellulose acylate shown in Table 3 was gradually added while stirred. The mixture was left at room temperature (25° C.) for 3 hours to swell. While moderately stirred, the swelled mixture was cooled to −30° C. at the rate of −8° C./minute and then further cooled to the temperature shown in Table 3. After kept at the temperature for 6 hours, the mixture was heated at the rate of +8° C./minute. When the mixture became a sol in a certain degree, it was started to stir the sol. The mixture was then heated to 50° C. to prepare a dope.

(1-1b) High Temperature-high Pressure Dissolution Method (Represented by "Heat" in Table 3)

To the solvent, each cellulose acylate shown in Table 3 was gradually added while stirred. The mixture was left at room temperature (25° C.) for 3 hours to swell. The swelled mixture was placed in a stainless steel-made air-tight container having a dual structure. Highly pressured steam was led to the outer jacket of the container, and thereby the mixture was heated at the rate of +8° C./minute to the temperature shown in Table 3 and kept at the temperature for 5 minutes under 1 Mpa. Water at 50° C. was then led to the outer jacket to cool the mixture at the rate of −8° C./minute to 50° C. Thus, a dope was prepared.

(1-2) Filtration of Cellulose Acylate Solution

The prepared dope was filtrated at 50° C. through filter paper having the absolute filtration precision of 0.01 mm (#63, Toyo Filter Co., Ltd.), and then further filtrated through filter paper having the absolute filtration precision of 0.0025 mm (FHO25, Pole).

(1-3) Production of Cellulose Acylate Film

The dope of (1-2) was cast by means of a casting machine described in Japanese Patent Provisional Publication No. 56(1981)-162617, and dried at 120° C. for 30 minutes. The formed film consisted of two or three layers. The two-layered film comprised an inner layer and an outer layer overlaid in order from the band support, while the three-layered one has a sandwiched structure of an outer layer/an inner layer/another outer layer. The details are shown in Table 3.

TABLE 3

| | Cellulose acylate | | | | | | |
|---|---|---|---|---|---|---|---|
| | Acetyl | C3 to C22 acyl | | | Substitution degree | | |
| | Degree (A) | Acyl (1) | Degree (B) | DP | at 2 | at 3 | at 6 |
| Exp. 1 | 2.7 | — | 0 | 310 | 0.90 | 0.90 | 0.90 |
| Exp. 2 | 2.36 | Pr | 0.3 | 370 | 0.88 | 0.83 | 0.95 |
| Exp. 3 | 2.74 | Bt | 0.12 | 350 | 0.96 | 0.92 | 0.98 |
| Exp. 4 | 2.60 | Bt | 0.1 | 310 | 0.94 | 0.87 | 0.89 |
| Comp. Ex. 1 | 2.58 | — | 0 | 390 | 0.94 | 0.82 | 0.82 |
| Comp. Ex. 2 | 2.33 | Pr | 0.1 | 400 | 0.61 | 0.92 | 0.90 |
| Comp. Ex. 3 | 2.53 | Bt | 0.1 | 390 | 0.85 | 0.85 | 0.83 |

Remarks:
(1) Pr: propionyl, Bt: butylyl
(A) Degree of acetyl substitution
(B) Degree of C3 to C22 acyl substitution

| | Dissolutaion | | Solvents (2) | | |
|---|---|---|---|---|---|
| | Method | Temperature | Non-chlorinated = wt. % | Chlorinated = wt. % | Alcohol = wt. % |
| Exp. 1 | Cool | −70° C. | MA/CH = 80/15 | None | MOL = 5 |
| Exp. 2 | Cool | −70° C. | MA/CP = 60/30 | None | MOL/POL = 5/5 |
| Exp. 3 | Heat | 160° C. | MA/AC = 75/10 | MC, 5 | MOL/EOL = 5/5 |
| Exp. 4 | Heat | 160° C. | None | MC = 90 | MOL/EOL = 5/5 |
| Comp. Ex. 1 | Heat | 160° C. | MA/AC = 75/10 | MC = 5 | MOL/EOL = 5/5 |
| Comp. Ex. 2 | Heat | 160° C. | None | MC = 90 | MOL/EOL = 5/5 |
| Comp. Ex. 3 | Heat | 160° C. | None | MC = 90 | MOL/EOL = 5/5 |

Remarks:
(2) MA: methyl acetate, CH: cyclohexane,
AC: acetone, AA: methyl acetocetate,
CP: cyclopentanone, MC: dichloromethane,
MOL: methanol, EOL: ethanol.
POL: 1-propanol, CT: carbon tetrachloride,
HP: n-hepatene

| | No. of layers | Concentration (3) of coating solutions and dry thickness | |
|---|---|---|---|
| | | Inner layer | Outer layer(s) |
| Exp. 1 | 1 | 18.0 wt. % (90 μm) | |
| Exp. 2 | 2 | 19.0 wt. % (30 μm) | 18.5 wt.% (50 μm) |
| Exp. 3 | 3 | 20.0 wt. % (50 μm) | 19.8 wt.% (20 + 20 μm) |
| Exp. 4 | 3 | 20.0 wt. % (50 μm) | 19.8 wt.% (20 + 20 μm) |
| Comp. Ex. 1 | 3 | 20.0 wt. % (50 μm) | 19.8 wt.% (20 + 20 μm) |

TABLE 3-continued

| Comp. Ex. 2 | 3 | 20.0 wt. % (50 μm) | 19.8 wt.% (20 + 20 μm) |
| Comp. Ex. 3 | 3 | 20.0 wt. % (50 μm) | 19.8 wt.% (20 + 20 μm) |

Remarks:
(3) Weight percent of cellulose acylate per the total weight percent (1-4) Results The prepared cellulose acylate solutions and films were evaluated in the aforementioned manners. The results were set forth in Table 4.

It was confirmed that the solutions and films of the invention had no problem with respect to stability of the solution, and mechanical and optical characters of the film. On the other hand, there were some defects on the surface of the films for comparison.

Further, the films were subjected to MD or TD stretching by 10 to 30% at 130° C. online in the drying step of the production process or offline after the step, and thereby the retardation could be increased by 40 to 160 nm in proportion to the stretching ratio.

It was further confirmed that the prepared cellulose acylate films were advantageously used in a liquid crystal display described in Example 1 of Japanese Patent Provisional Publication No. 10(1998)-48420, a discotic liquid crystal-containing optically anisotropic layer described in Example 1 of Japanese Patent Provisional Publication No. 9(1997)-26572, an orientation layer coated with polyvinyl alcohol, a liquid crystal display of VA type shown in FIGS. 2 to 9 of Japanese Patent Provisional Publication No. 2000-154261, and a liquid crystal display of OCB type shown in FIGS. 10 to 15 of Japanese Patent Provisional Publication No. 2000-154261. The film were also advantageously used as a polarizing plate described in Japanese Patent Provisional Publication No. 54(0.1979)-016575.

TABLE 4

|  | Stability of dope | Film surface | Viscosity at 40° C. (Pa · s)* | Haze (%) |
| --- | --- | --- | --- | --- |
| Exp. 1 | A | A | 400 | 0.1 |
| Exp. 2 | A | A | 430 | 0.1 |
| Exp. 3 | A | A | 410 | 0.1 |
| Exp. 4 | A or B | A or B | 590 | 0.2 |
| Comp. Ex. 1 | B | C | 950 | 0.5 |
| Comp. Ex. 2 | B or C | D | 1,150 | 0.6 |
| Comp. Ex. 3 | A | B | 850 | 0.4 |

Remarks:
*In consideration of production, the viscosity of dope is preferably 800 Pa · s or less at 40° C.

EXAMPLE 3

(1-1) Preparation of Cellulose Acylate Solution

In a 100-L stainless steel-made dissolution tank equipped with a stirring propeller, a mixed solvent consisting of the below-described components was placed. With the mixture vigorously stirred, powder (flakes) of cellulose acylate was gradually added to make the total weight 40 kg. All the solvent components, namely, methyl acetate, butanol, acetone, methanol and ethanol, contained less than 0.2 wt. % of water. After the powder of cellulose acylate was placed in the dissolution tank, the inner pressure of the tank was reduced to 1,300 Pa. The powder was then dispersed for 30 minutes by means of an eccentric stirring axis of dissolver type and an anchor wing provided on the central axis. The stirring sharing speed of the eccentric stirring axis was 15 m/second (the sharing stress was 5×104 kgf/m/second$^2$), and the rotating speed of the anchor wing was 1 m/second (the sharing stress was 1×104 kgf/m/second$^2$). During the dispersing step, the temperature changed from 25° C. to 48° C. After the dispersing step was completed, the eccentric stirring axis was stopped but the anchor wing was kept rotating at 0.5 m/second for 100 minutes to swell the cellulose acylate flakes. Until the flakes were swollen, nitrogen gas was charged in the tank to keep the inner pressure at 0.12 Mpa, and thereby the content of oxygen was kept less than 2 vol. % to prevent explosion. It was also confirmed that the dope contained water in an amount of 0.2 wt. % or less. The components of the cellulose acylate solution were as follows.

20 Weight parts of cellulose triacetate (total substitution degree: 2.82, substitution degree at 2-position: 0.95, substitution degree at 3-position: 0.94, substitution degree at 6-position: 0.93, viscosity average degree of polymerization (DP): 320, water content: 0.4 wt. %, viscosity of 6 wt. % methylene chloride solution: 305 mPa·s, average size and standard deviation of size: 1.5 mm and 0.5 mm); 58 weight parts of methyl acetate; 5 weight parts of acetone; 5 weight parts of methanol; 5 weight parts of ethanol; 5 weight parts of butanol; 1.2 weight parts of plasticizer A (ditrimethylol propane tetraacetate); 1.2 weight parts of plasticizer B (triphenylphosphate); 0.2 weight part of UV absorber a (2,4-bis-(n-octylthio)-6-(4-hydroxy-3,5-di-tert-butyla-nilino)-1,3,5-triazine); 0.2 weight part of UV absorber b (2-(2'-Hydroxy-3',5'-di-tert-butylphenyl)-5-chlorobenzotriazole); 0.2 weight part of UV absorber c (2-(2'-hydroxy-3', 5'-di-tert-amylphenyl)-5-chlorobenzotriazole); 0.05 weight part of fine particles (silicon dioxide (size: 20 nm), Mohs hardness number: approx. 7); and each polycarboxylic acid derivative (shown in Table 5). The solubility parameters of methyl acetate and acetone, which were main and auxiliary solvents, are 19.6 and 20.3, respectively, and they are in the preferred range of the present invention.

The used cellulose triacetate contained 0.1 wt. % or less of remaining acetic acid, 0.05 wt. % of Ca, 0.007 wt. % of Mg and 5 ppm of Fe. The substitution degree of acetyl group at 6-position was 0.95, which was 32.2% based on the total acetyl groups. The extraction with acetone was 11 wt. %, and the ratio between weight average molecular weight and number average molecular weight was 0.5. The cellulose triacetate was homogeneous. The haze, transparency, Tg and heat of crystallization were 0.08, 93.5%, 160° C. and 6.2 J/g, respectively.

(1-2) Cellulose Triacetate Solution for Film

The obtained inhomogeneous solution in the form of gel was sent by means of a screw pump, to pass through a cooling path so that the liquid might be cooled at −70° C. for 3 minutes. The path was cooled with cryogenic liquid at −80° C. having been cooled with a freezer. The thus-cooled solution was transferred to a stainless steel-made container, and stirred at 50° C. for 2 hours. The solution was then filtrated through filter paper having the absolute filtration precision of 0.01 mm (#63, Toyo Filter Co., Ltd.), and then further filtrated through filter paper having the absolute filtration precision of 2.5 μm (FHO25, Pole).

(1-3) Preparation of Cellulose Triacetate Film

The filtrated solution at 50° C. was then cast onto a mirror surface of a stainless steel-made support. The temperature of the support was 10° C., and the casting speed was 3 m/minute. The width of the cast dope was 70 cm. The dope on the support was dried with air at 55° C. for 5 minutes. The formed film was peeled from the support (in this stage the solid content of the film was in the range of about 30 to 60 wt. %), and then dried at 110° C. for 10 minutes and further at 150° C. for 30 minutes (in this stage the temperature of the film was about 140° C.). Thus, a cellulose triacetate film (thickness: 80 μm) was prepared.

(1-4) Results

With respect to peeling and surface condition (unevenness, warts) of the films containing the releasing agents of the invention, the results of the evaluations were set forth in Table 5. As shown in Table 5, the samples of the invention 1-2 to 1-11 left no flake when peeled from the support, and had such excellent surfaces that unevenness and warts were not observed and that the haze was small.

TABLE 5

| Sample No. (present invention) | Releasing agent | | Remaining | Film | | |
| --- | --- | --- | --- | --- | --- | --- |
| | Compound | Amount (weight part) | Force for peeling | flakes in peeling | Unevenness | Warts | Haze |
| 1-2 | RK-3 | 0.01 | 15 g/cm | B | B | A | 0.3 |
| 1-3 | RK-6 | 0.05 | 10 g/cm | A | A | A | 0.4 |
| 1-4 | RK-8 | 0.2 | 9 g/cm | A | A | A | 0.3 |
| 1-5 | RK-11 | 1 | 7 g/cm | A | A | A | 0.3 |
| 1-6 | RK-12 | 0.03 | 11 g/cm | A | A | A | 0.2 |
| 1-7 | RK-14 | 0.1 | 12 g/cm | A | A | A | 0.3 |
| 1-8 | RK-26 | 0.05 | 13 g/cm | A | A | A | 0.2 |
| 1-9 | RK-28 | 0.05 | 9 g/cm | A | A | A | 0.3 |
| 1-9 | RK-34 | 0.05 | 10 g/cm | A | A | A | 0.3 |
| 1-10 | RK-38 | 0.1 | 10 g/cm | A | A | A | 0.3 |

EXAMPLE 4

The process for preparing the sample 1-3 was repeated except that the cellulose triacetate solution of (1-2) was treated in the following manner, to prepare the sample 2-3.

The inhomogeneous cellulose triacetate solution of (1-2) in the form of gel was sent by means of a screw pump, to pass through a heating path heated and pressed at 180° C. and 1 Mpa, respectively. In the heating path, the solution was heated and pressed to 110° C. and 1 Mpa for 3 minutes, and then filtrated through filter paper having the absolute filtration precision of 0.01 mm (#63, Toyo Filter Co., Ltd.) and further filtrated through filter paper having the absolute filtration precision of 0.0025 mm (FHO25, Pole).

(2-1) Results

The prepared sample 2-3 of the invention was excellent in filtration, and left no flake on the support when peeled off. Further, the film made from the sample was excellent in unevenness, warts and haze. Thus, it was confirmed that the present invention could give excellent cellulose acetate solutions and films by the high temperature-high pressure dissolution method as well as by the solvent cast method.

EXAMPLE 5

The process for preparing the sample 1-3 of Example 3 was repeated except that neither the plasicizer A nor B was used, to prepare the sample 3-3. The sample left no flake on the support when peeled off. The film of the sample was classified as the grade A in terms of both unevenness and warts. The haze of the film was 0.3, which was an excellent value. The results of the bending test were 103 times (sample 1-3) and 82 times (sample 3-3). Since the sample 3-3 contained no plasicizer, the bending strength of the sample 3-3 was slightly inferior. Although this inferiority causes no practical problem, this example indicates it is preferred for the film to contain a plasicizer. The above bending test was performed in the following manner. Each prepared film was cut into a piece of 120 mm×120 mm, and left at 23° C. and 65RH % for 2 hours to control the water content. The piece was repeatedly bent according to ISO 8776/2-1988 to determine the number of bending times repeated until the piece was broken.

EXAMPLE 6

The process for preparing the sample 1-6 of Example 3 was repeated except that any of the UV absorbers a, b and c was not used, to prepare the sample 4-6. The sample left no flake on the support when peeled off. The film of the sample was classified as the grade A on both unevenness and warts. The haze of the film was 0.2, which was an excellent value. The samples were subjected to light fading test, in which the samples were exposed to a xenon lump of 30,000 lux for 1 month. While the haze of the sample 1-3 after the test was 0.4%, that of the sample 4-6 was 0.7. This result, therefore, indicates that it is preferred for the film to contain a UV absorber.

EXAMPLE 7

The process for preparing the sample 1-7 of Example 3 was repeated except that the fine particles of silica were not used, to prepare the sample 5-7. The sample left no flake on the support when peeled off. The film of the sample was classified as the grade A on both unevenness and warts. The haze of the film was 0.3, which was an excellent value. For testing slipperiness of the films, two of the same sample films were overlaid and slid. As a result, while the films of the sample 1-3 were smoothly moved, those of the sample 5-7 were somewhat frictionally slid. This result, therefore, indicates that it is preferred for the film to contain fine particles.

EXAMPLE 8

The process for preparing the sample 1-10 of Example 3 was repeated except that the cellulose triacetate solution of (1-2) was treated in the following manner, to prepare the sample film 6-10.

Some amount of the cellulose triacetate solution obtained in (1-1) was collected and diluted with methyl acetate in the amount of 10 wt. % based on the total amount, to prepare another cellulose triacetate solution (solution A). According to Japanese Patent Provisional Publication No. 06(1994)-134993, the prepared solution A and the cellulose triacetate solution of the sample 1-3 were cooperatively cast and layered so that the solution A might be outside (to form top and bottom layers) and that the solution 1-3 might be inside to be sandwiched between the layers of the solution A. The thus-prepared three-layered cellulose triacetate film had the total thickness of 40 μm, in which each outside layer and the inside layer had thickness of 3 μm and 34 μm, respectively.

The prepared film (sample 6-10) had a smoother surface than the sample 1-3, and hence it is preferred to perform the cooperative cast method.

EXAMPLE 9

An elliptically polarizing plate was produced in the manner described in Japanese Patent Provisional Publication No. 11(1999)-316378 as Example 1, except that the cellulose triacetate film (second film, thickness: 100 μm) of the sample 1-3 in Example 3 was used as the first transparent support, to prepare the sample 7-3. The thus-produced polarizing plate had excellent optical characters. This indicates that it is preferred to use a particular detergent solution in the production process of cellulose acylate film because the thus-produced film is preferably used for an optically polarizing plate.

EXAMPLE 10

An optical compensatory filter film was produced in the manner described in Japanese Patent Provisional Publication No. 7(1995)-333433 as Example 1, except that the cellulose triacetate film available from Fuji Photo film Co., Ltd. was replaced with the cellulose triacetate film of the sample 1-3 in Example 3. The obtained film gave excellent up-and-down and right-and-left viewing angles. This indicates that the cellulose triacetate film of the invention is also preferably used for optical devices.

EXAMPLE 11

It was confirmed for the present invention to be usable for various optical purposes. The cellulose triacetate film of the sample 11, which is a representative film of the invention, was used in a liquid crystal display described in Example 1 of Japanese Patent Provisional Publication No. 10(1998)-48420, a discotic liquid crystal-containing optically anisotropic layer described in Example 1 of Japanese Patent Provisional Publication No. 9(1997)-26572, an orientation layer coated with polyvinyl alcohol, a liquid crystal display of VA type shown in FIGS. 2 to 9 of Japanese Patent Provisional Publication No. 2000-154261, and a liquid crystal display of OCB type shown in FIGS. 10 to 15 of Japanese Patent Provisional Publication No. 2000-154261. All the thus-produced devices gave good performances.

EXAMPLE 12

The process for preparing the sample 1-3 of Example 3 was repeated except that the thickness of the film was made 120 μm, to prepare the sample 10-3. On one surface of the formed film, the first and second backing layers described in Example 1 of Japanese Patent Provisional Publication No. 4(1992)-73736 were provided. The formed backing layers contained an electrically conductive cationic polymer, and hence worked as electrically conductive layers. On the other surface of the film, the sample 105 described in Example 1 of Japanese Patent Provisional Publication No. 11(1999)-38568 was applied. Thus, a silver halide color photographic material was produced. The thus-produced photographic material gave excellent images and could be easily treated.

What is claimed is:

1. A cellulose acylate in which substitution degrees of acyl groups at 2- and 3-positions are in the range of 1.70 to 1.90 in total and a substitution degree of acyl group at 6-position is 0.88 or more.

2. The cellulose acylate as defined in claim 1, wherein the substitution degrees of acyl groups at 2-, 3- and 6-positions are 2.67 or more in total, and those at 2- and 3-positions satisfy the condition of:

$-0.1 \leq$(substitution degree of acyl group at 3-position)–(substitution degree of acyl group at 2-position)$\leq 0.3$.

3. The cellulose acylate as defined in claim 1, wherein the acyl group is acetyl.

4. A cellulose acylate solution containing a cellulose acylate dissolved in an essentially non-chlorinated solvent, said cellulose acylate having substitution degrees of acyl groups at 2- and 3-positions in total in the range of 1.70 to 1.90 and a substitution degree of acyl group at 6-position in the range of 0.88 or more.

5. The cellulose acylate solution as defined in claim 4, further containing a releasing agent.

6. The cellulose acylate solution as defined in claim 5, wherein the releasing agent is a polycarboxylic acid derivative having at least one carboxyl group or a salt thereof with an acid dissociation constant (pKa, 25° C.) of 4.4 or less.

7. The cellulose acylate solution as defined in claim 6, wherein the polycarboxylic acid derivative is a hydrocarbon polycarboxylic ester, a hydrocarbon polycarboxylic amide, an aromatic polycarboxylic ester, an aromatic polycarboxylic amide or a heterocyclic polycarboxylic amide, each of which has at least one carboxyl group or a salt thereof.

8. The cellulose acylate solution as defined in claim 4, wherein the non-chlorinated solvent is selected from the group consisting of ethers having 3 to 12 carbon atoms, ketones having 3 to 12 carbon atoms and esters having 3 to 12 carbon atoms.

9. The cellulose acylate solution as defined in claim 4, wherein the non-chlorinated solvent is a mixture consisting of three or more different solvents, one is selected from the group consisting of methyl acetate, ethyl acetate, methyl formate, ethyl formate, acetone, dioxolan and dioxane, another is selected from the group consisting of ketones and acetoacetate esters having 4 to 7 carbon atoms, and still another is selected from the group consisting of alcohols and hydrocarbons having 1 to 10 carbon atoms.

10. The cellulose acylate solution as defined in claim 9, wherein the first and second solvents are selected from the group consisting of methyl acetate, ethyl acetate, methyl formate, ethyl formate, acetone, dioxolan and dioxane, and the third solvent is selected from the group consisting of alcohols and hydrocarbons having 1 to 10 carbon atoms.

11. A process for preparation of cellulose acylate solution, in which a mixture of an essentially non-chlorinated solvent and a cellulose acylate having substitution degrees of acyl groups at 2- and 3-positions in total in the range of 1.70 to 1.90 and a substitution degree of acyl group at 6-position in the range of 0.88 or more is cooled to −80 to −10° C. or heated to 80 to 220° C., so that the cellulose acylate is dissolved in the solvent.

12. A cellulose acylate film made of a cellulose acylate in which substitution degrees of acyl groups at 2- and 3-positions are in the range of 1.70 to 1.90 in total and a substitution degree of acyl group at 6-position is 0.88 or more.

* * * * *